United States Patent [19]

Fukushima et al.

[11] 4,367,187
[45] Jan. 4, 1983

[54] PROCESS FOR THE PRODUCTION OF BLOW MOLDED ARTICLES

[75] Inventors: Hatahiko Fukushima, Katano; Tadahiko Handa, Takarazuka; Kiyoshi Ochiai, Nishinomiya, all of Japan

[73] Assignees: Air Products and Chemicals, Inc., Allentown, Pa.; Daido Oxygen Company Ltd., Osaka, Japan

[21] Appl. No.: 258,963

[22] Filed: Apr. 30, 1981

[30] Foreign Application Priority Data

May 9, 1980 [JP] Japan ................................. 55-062085

[51] Int. Cl.³ ........................ B29C 17/07; B29C 25/00
[52] U.S. Cl. ........................................ 264/37; 264/526; 264/528
[58] Field of Search .................. 264/37, 528, 28, 526

[56] References Cited

U.S. PATENT DOCUMENTS

Re. 28,497 7/1975 Gabmire .................... 264/528 X

Primary Examiner—Jan H. Silbaugh
Attorney, Agent, or Firm—Richard A. Dannells, Jr.; E. Eugene Innis; James C. Simmons

[57] ABSTRACT

In a blow molding process in which a parison is blown to form an article which is then cooled and recovered, a liquified gas is introduced into the interior of partially blown article where it becomes vaporized and causes the completion of the blowing step as well as to cool the article. A mixture of the blowing gas and vaporized liquified gas is recovered and recycled for use as the blowing gas in a subsequent blow molding step.

1 Claim, 1 Drawing Figure

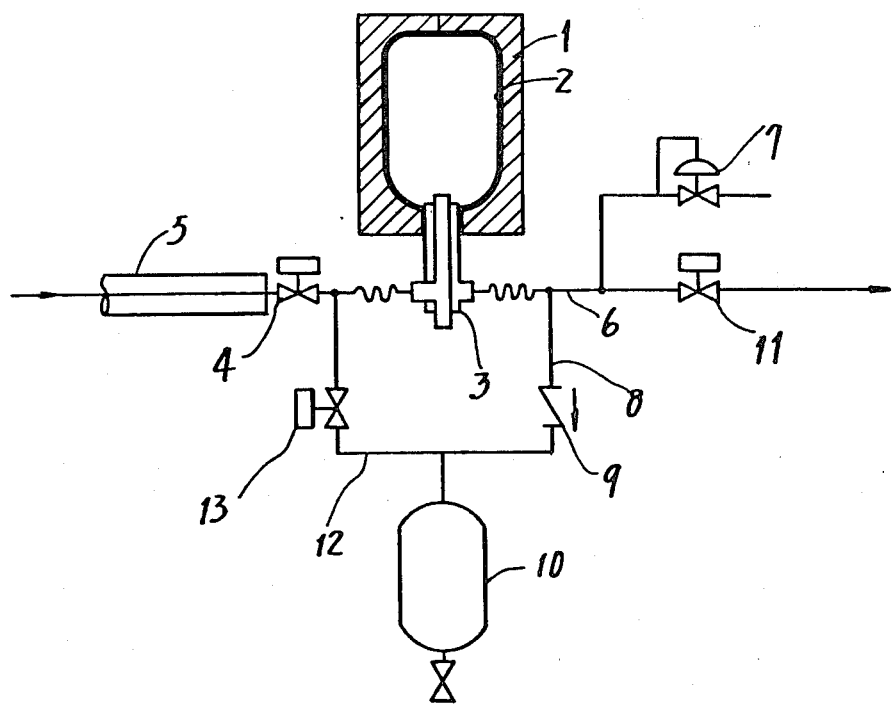

PROCESS FOR THE PRODUCTION OF BLOW MOLDED ARTICLES

TECHNICAL FIELD

This invention relates to a process for the production of blow molded articles having improved productivity through the use of liquefied gas for rapidly cooling the blow molded articles. In particular, it relates to a blow molding process in which the liquefied gas used for cooling is vaporized, stored and reused as the blowing gas.

BACKGROUND OF THE PRIOR ART

In accordance with the prior art methods, blow molding articles are produced by extruding a hollow plastic substance while in a semi-molten state (hereinafter referred to as the "parison"), clamping the parison within a mold, blowing air into the inside of the parison to form a blow molded article, then externally cooling the article by passing cold water through the molds. In addition, it is known to increase the cooling effect by using the latent heat and the sensible heat of liquefied gas at low temperatures such as liquid carbon dioxide and liquid nitrogen (LIN) by directing the liquefied gas into the interior of the blow molding article during the cooling stage.

When liquid carbon dioxide is used as a coolant, great difficulty is experienced in decreasing the pressure within the feed conduit to the mold so that it is below the triple point of carbon dioxide, e.g., 4.2 kg./cm.2 gauge. Furthermore, if liquid carbon dioxide is injected directly into the parison at the commencement of the blowing cycle, it precipitates in the form of snow or dry-ice and attaches itself to the inner wall of the blow molded article while it is still at high temperatures. This results in great strain on the wall of the article as a result of the non-uniformity of the thermal stress. Therefore, the usual practice is first to introduce air into the blow molded article above the triple point pressure of carbon dioxide and then to introduce the liquefied gas such as carbon dioxide or LIN into the pre-formed article. In this prior art method, in which two fluid mediums are used for this coolant step, namely compressed air and liquefied carbon dioxide, complications exist because the feed conduit and the feed nozzle become plugged from the freezing of the moisture in the compressed air. The prior art also teaches the use of liquid carbon dioxide for blowing and cooling. For the reasons described above, additional equipment is required in this prior art method so that the liquid carbon dioxide is vaporized at the beginning of the blowing step before it can be used as the blowing gas.

It is also known in the prior art to use for cooling blow molded articles LIN which has a more intensive cooling action over liquid carbon dioxide. According to the disclosure of such prior art methods, LIN is passed from a suitable storage through a LIN supply valve, a downstream pipe and a blow mandrel where it is vaporized before it is passed into the parison during the beginning of the blowing step. The LIN in this case is passed through a single supply line. The disadvantage of this prior art process is that the possibility exists of forming ice on the outer surface of the LIN feed conduit which results in a great loss in its ability to transmit heat. As a result, the LIN does not become vaporized and flows into the parison at fluctuating temperatures which produces strain on the resulting blow molded article or causes surface defects from cold shock when the blow molding operation is continuously cycled. Specifically it has been found in the case of blowing large containers, it is necessary to vaporize LIN with a heater or to use a vaporizer to assure that the nitrogen is supplied in its gaseous state. In addition, the prior art methods have been plagued with the problem of the inability to quantitatively feed the vaporized LIN for the blowing step. Therefore, it has been found that when blow molding large containers in which LIN is used, air is first used as the blowing gas and subsequently LIN is introduced to cool the preformed article. This method has also the same disadvantages as those described above in connection with the use of liquefied carbon dioxide. The feed conduit between the blow pin used to introduce the blowing gas and the LIN supply valve is comparatively long in order to introduce heat storage capacity. As a result, the loss of LIN by the end of the blowing step is considerable resulting in another disadvantage of these prior art processes.

BRIEF SUMMARY OF THE INVENTION

The process of the present invention overcomes the disadvantages of the prior art blow molding processes by providing an economical and reliable process for the production of blow molded articles. In a process for the production of such articles which comprises the steps of extruding a thermoplastic in a molten state to form a parison, blowing the parison within a closed mold to conform its walls to the contour of the mold, cooling the resulting blow molded article and recovering the cooled article, the improvement comprises:
 (a) introducing a liquefied gas into said parison that is being blown with a blowing gas,
 (b) vaporizing said liquefied gas from the heat of the molten parison to cause the parison to conform to the contours of said mold,
 (c) recovering a mixture of said blowing gas and vaporized liquefied gas, and
 (d) using the mixture as a portion of the blowing gas during the blowing step.

BRIEF DESCRIPTION OF DRAWING

The drawing is a process flow diagram illustrating an embodiment of the present invention in which
1=mold, 2=blow molded article, 3=blow pin, 4=LIN supply solenoid valve, 5=insulated piping, 6=exhaust line, 7=back pressure regulator, 8=gaseous N2 (hereinafter referred to as "GN2") storage line, 9=check valve, 10=GN2 reserve tank, 11=exhaust solenoid valve, 12=GN2 supply line and 13=GN2 supply solenoid valve.

DETAILED DESCRIPTION OF INVENTION

As shown in the drawing, one apparatus suitable for carrying out the process of the present invention includes mold 1 having enclosed therein blow molded article 2. Blow pin 3 having a double tube configuration is shown inserted into the neck of inverted article 2 within mold 1. As LIN supply solenoid valve 4 is opened, LIN flows into mold 1 through insulated piping 5, solenoid valve 4 and into the inner tube of blow pin 3. To minimize the loss of LIN during the end of the blowing step, the distance between LIN supply solenoid valve 4 and blow pin 3 is maintained as short as possible; i.e. valve 4 and blow pin 3 are immediately adjacent to one another. LIN is sprayed from the end of the inner tube of blow pin 3 into the preformed molded article 2 immediately following the gas blowing step. This spray quickly cools article 2 with its latent heat and sensible heat. Simultaneously, GN2 which is vaporized as the result of the heat exchange with the blow molded article 2 expands and, if necessary, causes at least partially expanded blow molded article 2 to conform to the walls of mold 1 during the end of the blowing cycle. In the event the pressure in mold 1 exceeds the blowing pressure during the injection of LIN, back pressure regulator 7 connected to outer tube of blow pin 3 is actuated to exhaust any of the excess gas out of blow molded article 2 and thus maintains the blowing pressure within desired limits. During this step, GN2 that is heated during its contact with the interior walls of blow molded article 2 passes through exhaust line 6, GN2 storage line 8 (one end of which is connected to the upstream end of exhaust line 6), check valve 9 and into GN2 reserve tank 10 for storage.

When the blowing cycle is finished, the pressure inside blow molded article 2 is released by opening exhaust solenoid valve 11 and article 2 is removed. The pressure in GN2 reserve tank 10 is maintained by means of check valve 9. At the commencement of a new blowing cycle, GN2, which has been stored in GN2 reserve tank 10, is blown into the parison (not shown) enclosed within mold 1 from a nozzle from the top end of the inner tube of blow pin 3 via line 12 and through GN2 supply solenoid valve 13. In this manner the blowing gas step is accomplished with the recovered GN2 followed by the cooling step described above.

The pressure of blow molded article 2 while in the gas blowing step by means of GN2 can be indicated as follows:

$$P_1 = P_2 \times V_2 / (V_1 + V_2)$$

wherein $V_1$ is the volume of blow molded article 2, $V_2$ and $P_2$ are the volume and pressure of the GN2 reserve tank 10, respectively.

It is recognized that a quantitative amount of GN2 can be reliably supplied to the parison. Subsequently, upon indication from, for instance, a timer, GN2 supply solenoid valve 13 is closed and LIN supply solenoid valve 4 is opened. As the result of this LIN is sprayed into blow molded article 2 for rapid cooling as described above and is continuously fed, if necessary, until the end of the blowing cycle. During the same time GN2 that is vaporized and warmed in blow molded article 2 to a sufficiently high temperature is again allowed to pass into GN2 reserve tank 10. The amount of GN2 volume to be blown in the subsequent cycle can be easily be controlled with the adjustment of the setting of such a timer or by controlling the pressure in GN2 reserve tank with a pressure regulator (not shown) between GN2 reserve tank 10 and check valve 9.

The process of the present invention has the following advantages over processes of the prior art:

1. The distance between LIN supply solenoid valve 4 and blow pin 3 can be designed to be very short and accordingly the loss of LIN is minimized.

2. The electric power for an air compressor becomes unnecessary since only nitrogen is used as the blowing and cooling medium and therefore plugging because of the freezing of moisture within air is avoided.

3. GN2 blown into the gas blowing step is simply the by-product that is recovered during the cooling cycle with blow molded article 2 and no additional equipment such as a heater or heat exchanger is necessary.

4. The volume of GN2 can easily be reliably maintained at a constant volume to prevent cold shock during the beginning of the blowing stage.

The resulting blow molded articles are rapidly, reliably and economically produced and cooled by means of the process of this invention.

What is claimed is:

1. In a process for the production of blow molded thermoplastic articles comprising the steps of extruding a thermoplastic in a molten state to form a parison, blowing said parison within a closed mold to conform its walls to the contour of said mold, cooling said resulting blow molded article, and recovering the cooled article, the improvement which comprises:
   (a) introducing a liquefied nitrogen gas into said parison as it is being blown with a blowing gas,
   (b) vaporizing said liquefied gas from the heat of the molten parison to cause said parison to conform to the contours of said mold and to cool said blow molded article,
   (c) recovering a portion of the resulting mixture of said blowing gas and vaporized liquefied gas,
   (d) using said recovered portion of said mixture as at least a portion of the blowing gas during a subsequent blowing step, and
   (e) releasing the remaining portion of said mixture from said blow molded article.

* * * * *